UNITED STATES PATENT OFFICE.

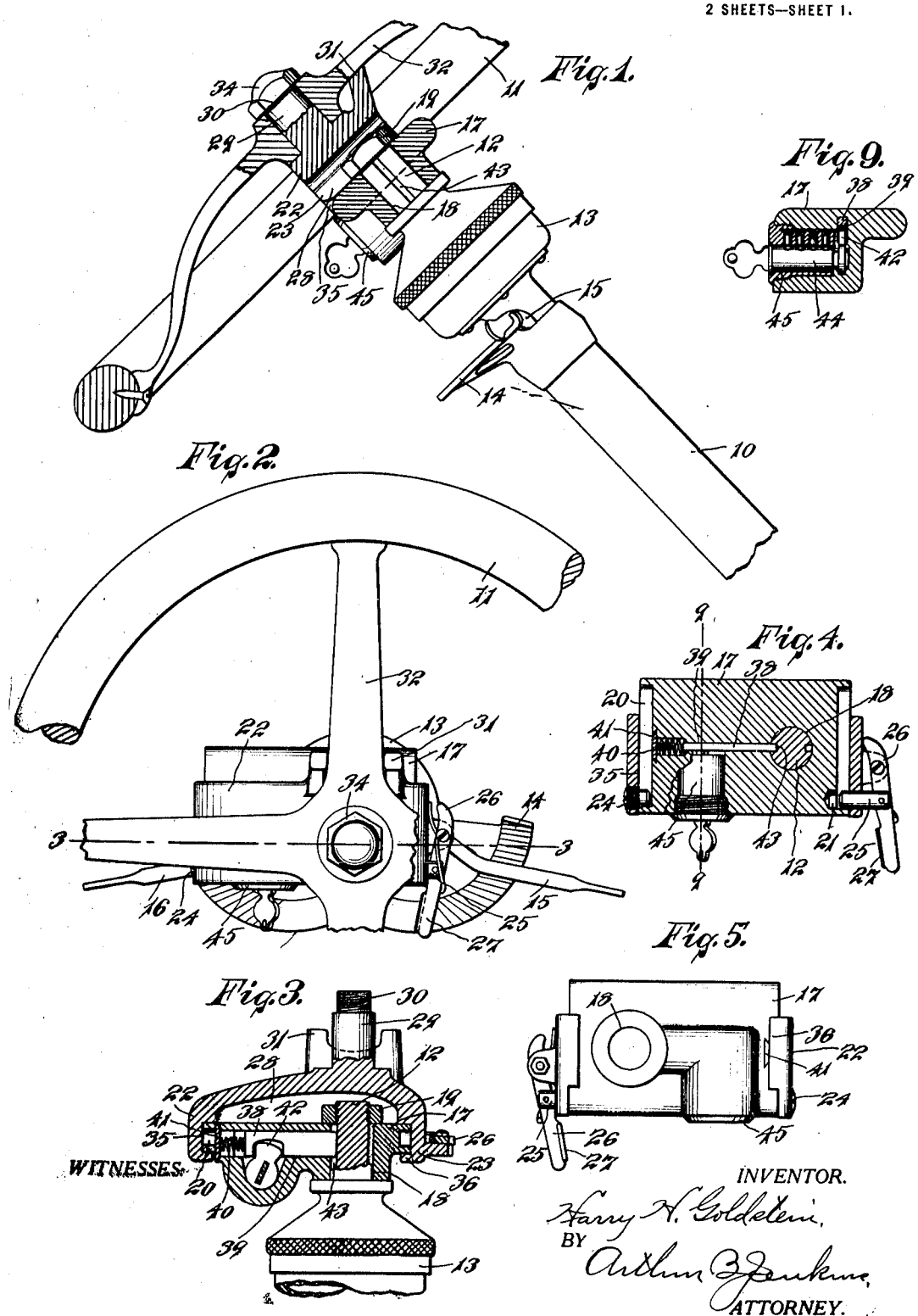

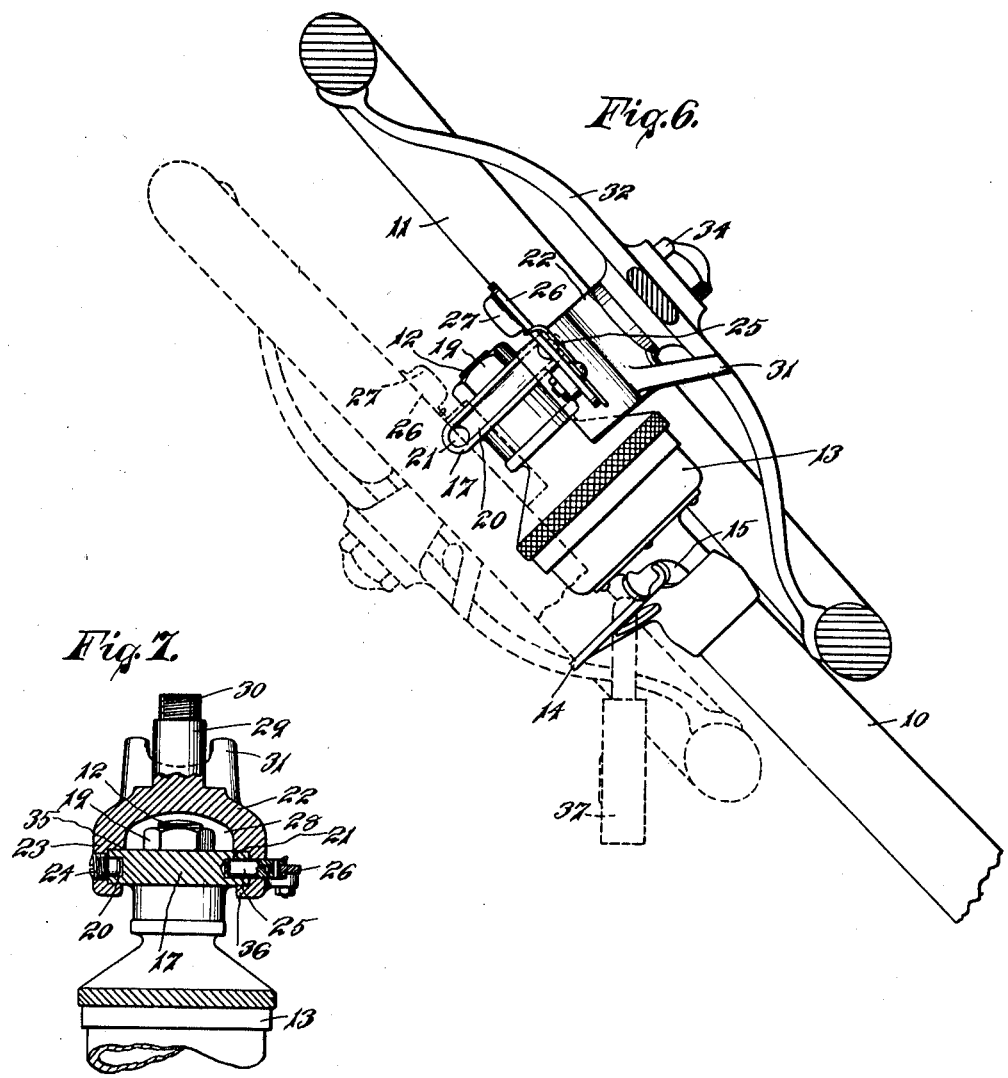

HARRY H. GOLDSTEIN, OF HARTFORD, CONNECTICUT.

STEERING-WHEEL.

1,314,741.  Specification of Letters Patent.  Patented Sept. 2, 1919.

Application filed October 17, 1917. Serial No. 197,002.

*To all whom it may concern:*

Be it known that I, HARRY H. GOLDSTEIN, a citizen of the United States, residing at Hartford, in the county of Hartford and State of Connecticut, have invented a new and Improved Steering-Wheel, of which the following is a specification.

My invention relates more especially to that class of steering wheels employed in the operation of traction vehicles, and an object of my invention, among others, is to provide an attachment that may be readily applied to the steering posts or shafts of vehicles in common use and without change in any manner of the structure of any of the parts of the steering mechanism; a further object of the invention is to provide a simple device embodying means to permit the steering wheel to be moved to permit the driver to readily leave or take his seat in front of the steering wheel; and a further object of the invention is to provide means for rendering a steering wheel ineffective as a steering element whereby operation of the vehicle may be prevented.

One form of device embodying my invention and in the construction and use of which the objects herein set out, as well as others, may be attained, is illustrated in the accompanying drawings, in which—

Figure 1 is a view of the upper end of the steering post or shaft of a vehicle and of a portion of the steering wheel thereon, showing my improved attachment applied thereto.

Fig. 2 is a top plan view of the same.

Fig. 3 is a detail view in section through my improved attachment on plane denoted by dotted line 3—3 of Fig. 2.

Fig. 4 is a detail view in horizontal section through the base of my improved attachment.

Fig. 5 is a detail bottom view of the same.

Fig. 6 is a view illustrating in dotted lines the position in which my improved attachment will permit the steering wheel to be placed so that it may be readily locked to render said wheel ineffective.

Fig. 7 is a detail view illustrating one form of my improved attachment with the locking mechanism omitted therefrom.

Fig. 8 is a detail view illustrating my improved locking mechanism applied directly to the steering wheel of a vehicle.

Fig. 9 is a detail view in cross section through the base on plane denoted by dotted line 9—9 of Fig. 4 and showing the lock parts in position to prevent removal of the key.

By the use of my improved attachment I am enabled, without change of any part whatsoever of the regular steering wheel of a vehicle, to transform the ordinary steering post and rigidly attached steering wheel into a structure whereby the wheel may be readily tipped or moved to one side to permit the driver to leave his seat or take his place at the steering wheel, such a structure being shown in the accompanying drawings in which the numeral 10 indicates the steering pillar of a traction vehicle, as an automobile, that may be of any ordinary form and construction and within which the steering shaft or post extends and which may be connected with the steering wheel 11 in any of the different and ordinary ways common to structures of this class, such structures all embodying a stud 12 which is directly engaged with the steering wheel. The structure herein shown illustrates a case 13 containing transmission gearing common to the type of automobile known as the "Ford", and 14 indicates a rack common to such vehicles and arranged to aid in positioning the throttle and spark levers 15 and 16 respectively. All of the parts thus far described may be of any ordinary and well known construction and except in connection with other parts to be hereinafter described constitute no part of my invention forming the subject matter of this case.

My improved attachment consists of a base 17 having a hole 18 to fit the stud 12 of the ordinary steering mechanism, said base being secured in place by a nut 19 forming part of my improved attachment and threaded to fit said stud. This base is provided on opposite sides with grooves 20 and with a keeper recess 21 opening from the bottom of one of said grooves, and preferably at the end thereof.

A steering wheel support 22 is mounted to slide and to tilt upon the base, said support being arched to provide side parts 23 from which a pivot stud 24 and a pivot and locking bolt 25 project. The pivot stud 24 is preferably a screw stud projecting into one of the grooves, and the bolt projects into the other groove, said bolt being mounted to slide so that its inner end may engage the keeper recess 21. A locking lever 26 is pivotally mounted on one of the side parts and is loosely engaged with the pivot and locking bolt 25, one end of said lever being formed as a thumb piece 27 by means of which the lever may be actuated, and its other end being adapted to engage the side of the side part to limit the movement of the lever and hence of the bolt 25 so that the latter will not be withdrawn from its groove, but may be withdrawn from the keeper recess. A spring may be employed to hold the lever in position with the bolt engaging said keeper recess.

The arched form of the steering wheel support provides an opening 28, when the support is attached to the base 17, the end of the stud 12 and the nut 19 being located in such opening. A steering wheel stud 29 projects upwardly from the crown of the arched support, said stud being of the same size as the stud 12 and having a screw threaded end 30 to receive the nut 19, before the attachment is placed upon the steering post. Horns 31 project upwardly from the support at one side thereof, these horns being spaced apart to receive one of the arms 32 of the steering wheel 11 of the ordinary form and construction and which wheel fits the stud 12 in the original structure of the steering mechanism and is secured to said stud by means of the ordinary nut 34. The inner facing surfaces of the side parts 23 are provided with guide grooves 35 within which the edges of the base 17 project, and with lips 36 on the under side of the base forming one side of the grooves. It will be noted that the attachment is secured in place on the steering post or shaft of a vehicle by removing the nut 19 from the stud 29 (on which it is placed when the attachment is ready for sale) and the nut 34 from the stud 12 of the ordinary mechanism and removing the steering wheel from the stud 12. The base 17 is now placed in position with the stud 12 projecting through the hole 18 and the nut 19 is placed on said stud to secure the base in place. The steering wheel is now placed on the stud 29 of the attachment and the nut 34 of the original steering wheel is placed on said stud to secure the steering wheel.

By means of the structure thus far described, the steering wheel may be tilted into the position shown in Fig. 6 by withdrawing the bolt 25 from its keeper, as by means of the lever 26 and sliding the base forward or away from the driver's seat. The lips 36 terminate at a little distance from the back edge of the base, or that edge toward the driver's seat, as shown in Fig. 5 of the drawings, so that when, in this sliding movement, the pivot stud and locking bolt reach the forward ends of the grooves 20, the lips having been moved beyond the front edge of the base, the latter may be tipped up to lock the steering wheel in the position shown in Fig. 6 of the drawings. If it now be desired to lock the vehicle against unauthorized use the steering shaft may be turned so that the steering wheel will occupy the position shown in dotted lines in Fig. 6 of the drawings, and the hasp of the padlock 37 may be placed over one of the arms of the steering wheel and the central portion of the rack 14 and the front wheels of the vehicle will thus be locked in such position that the vehicle can move only in a short circle and this will effectively prevent its being driven away.

I have also provided means as an important part of my improved attachment for locking the steering mechanism against movement by providing a locking bolt 38 mounted to slide in a hole 39 extending from the side edge of the base into the hole 18, and as shown in Fig. 4 of the drawings. The hole 39 is enlarged at its mouth to receive a spring 40 to frictionally force the bolt to its locked position, and the mouth of the hole may be closed in any suitable manner, a slide 41 being shown in the accompanying drawings for this purpose. A lock of any desired construction may be employed to operate the bolt 38, in the structure herein shown a cylinder lock of the "Yale" type being employed. The operation of this lock will be readily understood, it being sufficient to state that the barrel of the lock has a lug 42 at its end to enter a recess in the locking bolt 38 as shown in Fig. 3 of the drawings. When the key is turned to throw the bolt 38 into the hole 18 the bolt will enter one of the key slots 43 provided in the stud 12 to receive the keys that secure the wheel in place in the original structure. In this position of the parts the tumblers in the barrel 44 of the lock will be opposite the smooth inner wall of the shell 45, in a manner that will be readily understood and the key cannot be removed. When the key is turned to its unlocked position the tumblers in the shell and in the barrel will register and the key can then be removed and the tumblers in the two parts of the lock passing into the tumbler openings in the opposite part will hold the barrel against rotation and the bolt 38 will thus be secured with its end out of the key slot 34. This will enable the wheel 38 to be freely rotated and it cannot, therefore, be made use of to steer the vehicle and the latter is deprived of effective steering mechanism and cannot be driven. The arrangement of the lock mechanism is such that the key must be withdrawn to secure the parts to permit the free rotation of the steering wheel on its stud and, therefore, it is apparent that whenever the key is not in place the parts are in position to prevent unauthorized use of the vehicle.

The form of my improved attachment shown in Fig. 7 illustrates its construction and manner of operation without the lock, this form of the structure enabling the device simply to be used for the purpose of moving the wheel out of the way. It may be locked after the manner shown in Fig. 6, if desired.

In the form of the device shown in Fig. 8 the locking feature is made use of but the means for moving and tipping the wheel are omitted. In this form of the device the wheel 33 has one of its arms supplied with a boss 46 in which the lock parts hereinabove described are assembled, in the same manner as hereinabove set forth, and further description is, therefore, omitted at this point as this embodiment of the invention and the operation of the parts will be readily understood.

I claim:

1. A base having means to operatively connect it with a steering wheel shaft, a support mounted to slide on the base in a direction transverse to the axis of said shaft, and means upon the support to receive a steering wheel.

2. A base having means to operatively connect it with a steering wheel shaft, a support slidably and pivotally mounted on the base, and means upon the support to receive a steering wheel.

3. A base having means to operatively connect it with a steering wheel shaft, a support slidably and pivotally mounted on the base, means for locking the base and support together in one position of the parts, and means upon the support to receive a steering wheel.

4. A base having means to operatively connect it with a steering wheel shaft, a support slidably mounted on the base, means to permit pivotal movement of the support on the base in one position of the parts, means to prevent such pivotal movement of the support in another position of the parts, and means upon the support to receive a steering wheel.

5. A base having means to secure it to a member of a steering mechanism, said member having means to receive said base, a support slidably mounted on the base, and means upon said support to receive a steering wheel, said means being like to those to receive said base on said member.

6. A base rigidly connected with a rotatable member of a steering mechanism, a support slidably mounted on the base, and means for rigidly securing a steering wheel to said support.

7. A base having means to rigidly connect it with a rotatable member of a steering mechanism, said base having guide grooves in its edge, a support having guides to enter said grooves, said support having means to prevent pivotal movement in certain positions but to permit pivotal movement in other positions of the parts, and means for rigidly securing a steering wheel to said support.

8. A base having means to rigidly connect it with a rotatable member of a steering mechanism, said base having guide grooves in its opposite sides, a support having lips forming grooves to receive the edges of said base, said lips being of a length to be located beyond the edge of the base in the sliding movement thereof, and means for rigidly securing a steering wheel to said support.

9. A base having means to rigidly connect it to a rotatable member of a steering mechanism, said base having grooves to receive guides and a keeper recess, a support mounted to slide on said base and having a locking bolt to enter said recess, and means for rigidly securing a steering wheel to said support.

10. A base having means to rigidly connect it to a rotatable member of a steering mechanism, said base having guide grooves in its opposite edges, a support having studs to enter said guide grooves, and lips forming grooves to receive the edges of the base, said parts being constructed to permit tipping movement of the support with the studs acting as a pivot, and means for rigidly securing a steering wheel to said support.

11. A base and a rotatable member of a steering mechanism, having guide grooves and a keeper recess, said base having means to rigidly connect it to said rotatable member, a support having studs to enter said grooves, one of said studs being movable to act as a locking bolt, means to permit tipping movement of the support on the base, and means for rigidly securing a steering wheel to said support.

12. In combination with a rotatable member of a steering mechanism, a base mounted to rotate freely on said member and having means for removable attachment thereto, said member having means to receive said base, a support slidably and pivotally mounted on said base, means on said support to receive a steering wheel, said means being like those to receive said base, and key operated mechanism on said base arranged to lock said member and base against relative rotation.

13. A steering mechanism including a base, a support, means for slidably and pivotally mounting said support on the base and including a bolt constructed to act as a locking bolt and a pivotal mount for the base, and means for operating said bolt.

14. A steering wheel comprising a hand ring, a connecting member pivotally secured thereto and mounted for rotation on a steering post, means to secure said connecting member for rotation with the steering post and means for sliding said connecting member away from the driver of the vehicle.

15. In combination with a steering shaft, a base mounted on and to rotate on the axis of said shaft, a support movably mounted on the base, and means for securing a steering wheel to said support.

16. In combination with a steering shaft, a base mounted on and to rotate on the axis of said shaft, a support mounted on the base for tipping action thereon, and means for securing a steering wheel to said support.

17. A steering mechanism including a member supported at the end of a steering shaft, means for securing a steering wheel to said member, and means upon said member to positively engage said steering wheel and independently prevent rotative movement thereof, said engaging means being independent of said securing means.

18. A steering mechanism including a member supported at the end of a steering shaft, means for securing a steering wheel to said member, and an element projecting from said member to removably and positively engage said steering wheel and independently prevent rotative movement thereof, said engaging means being independent of said securing means.

19. A steering mechanism including a member removably secured to the end of a steering shaft, means for securing a steering wheel to said member, and means projecting from said member to removably and positively engage said steering wheel and independently prevent rotative movement thereof, said engaging means being independent of said securing means.

20. A steering mechanism including a member secured to the end of a steering shaft, means for securing a steering wheel to said member, and a pair of prongs projecting from said member to receive a spoke of said wheel between them.

HARRY H. GOLDSTEIN.